United States Patent [19]
Schuler et al.

[11] Patent Number: 5,816,110
[45] Date of Patent: Oct. 6, 1998

[54] LOCKING DEVICE FOR VEHICLE SEATS

[75] Inventors: Rolf Schuler, Heiligenhaus; Heinz Voss, Leverkusen; Gerhard Mitulla, Bochum; Jurgen Stemmer, Wuppertal, all of Germany

[73] Assignee: Keiper Recaro GmbH & Co., Germany

[21] Appl. No.: 809,715

[22] PCT Filed: Sep. 1, 1995

[86] PCT No.: PCT/EP95/03443

§ 371 Date: Mar. 28, 1997

§ 102(e) Date: Mar. 28, 1997

[87] PCT Pub. No.: WO96/11123

PCT Pub. Date: Apr. 18, 1996

[30] Foreign Application Priority Data

Oct. 11, 1994 [DE] Germany ................ 44 36 221.81

[51] Int. Cl.⁶ ................ G05G 5/06; B60N 2/08
[52] U.S. Cl. ................ 74/527; 248/429
[58] Field of Search ................ 74/527; 248/423, 248/429, 430

[56] References Cited

U.S. PATENT DOCUMENTS

| | | | |
|---|---|---|---|
| 4,645,160 | 2/1987 | Van Duser | 248/429 |
| 4,712,759 | 12/1987 | Sugama et al. | 248/429 |
| 5,234,189 | 8/1993 | Myers | 248/429 |
| 5,560,262 | 10/1996 | Orzech | 74/527 |
| 5,564,315 | 10/1996 | Schuler et al. | 74/527 |
| 5,596,910 | 1/1997 | Bauer et al. | 248/429 X |

FOREIGN PATENT DOCUMENTS

| | | | |
|---|---|---|---|
| 0408932 | 1/1991 | European Pat. Off. . | |
| 0567226 | 10/1993 | European Pat. Off. . | |
| 2713973 | 10/1978 | Germany | 248/429 |
| 4330870 | 9/1994 | Germany . | |
| 4400474 | 3/1995 | Germany . | |
| 4444075 | 6/1995 | Germany . | |

*Primary Examiner*—Charles A. Marmor
*Assistant Examiner*—Mary Ann Battista
*Attorney, Agent, or Firm*—Roylance,Abrams,Berdo & Goodman, L.L.P.

[57] ABSTRACT

A locking device for vehicle seats, in particular motor vehicle seats, has a row of detent openings and a plurality of spring-loaded bolts which are disposed one behind the other in the direction of this row. The locking bolts engage independently of one another in the detent openings. At least two of these bolts can each engage in one of the detent openings and lock the seat parts without play in both adjusting directions, in any position within the adjusting range of these parts which are to be locked. The seat parts can be continuously adjusted relative to one another. In addition to its movability enabling it to engage in one of the detent openings, each locking bolt has at least one component part which is separately movable. A flat area is provided on each bolt for play-free abutment on the delimiting surface of each detent opening and is brought into abutment with the delimiting surface without altering the depth of penetration of the bolt in the detent opening.

25 Claims, 10 Drawing Sheets

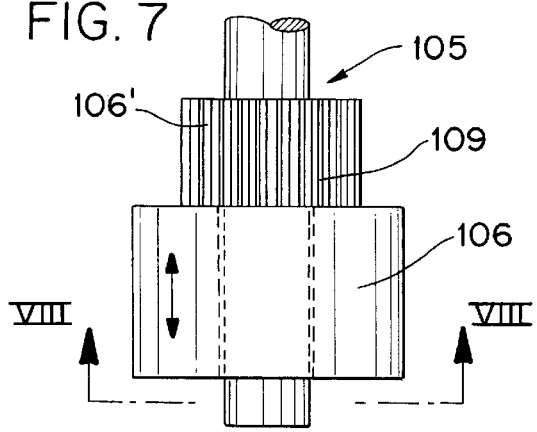
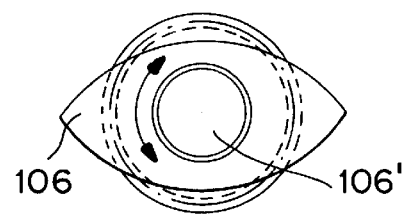
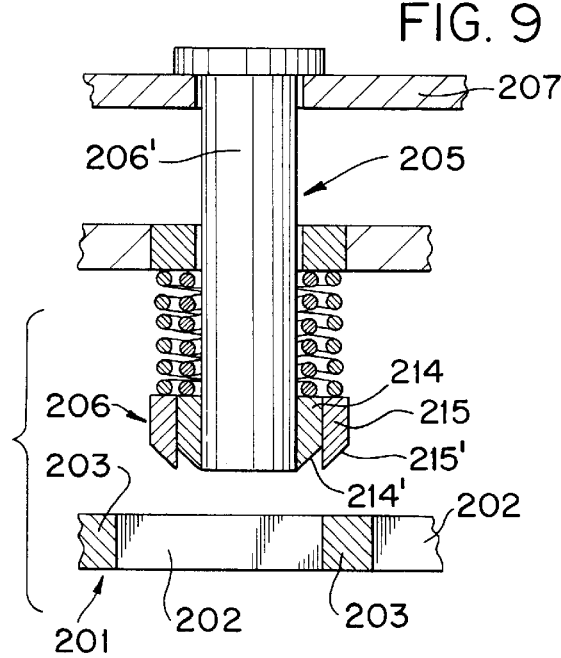
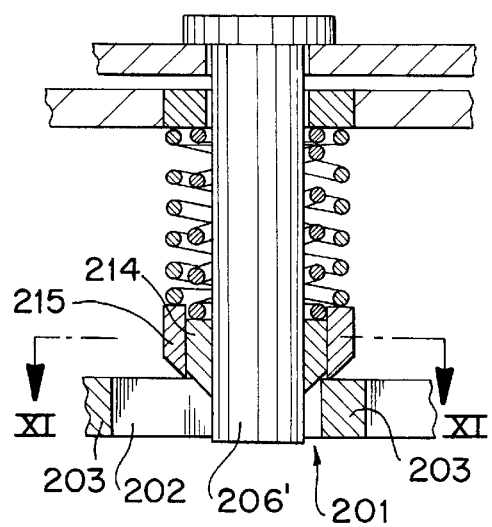
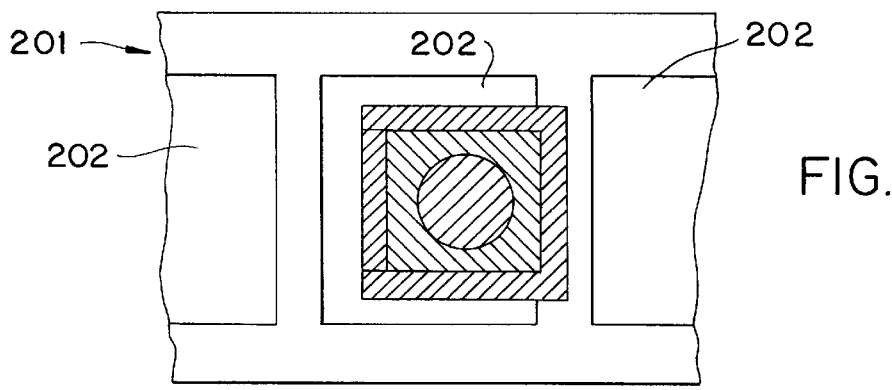

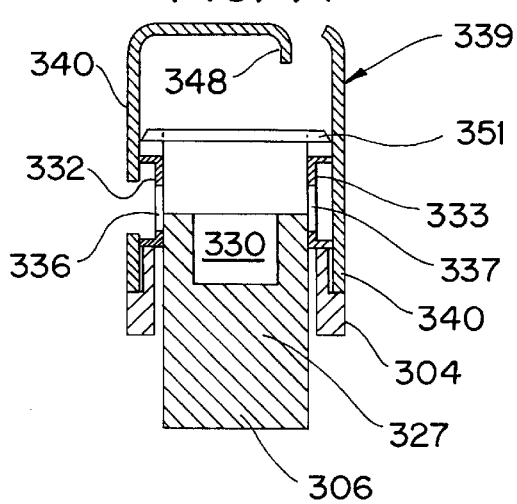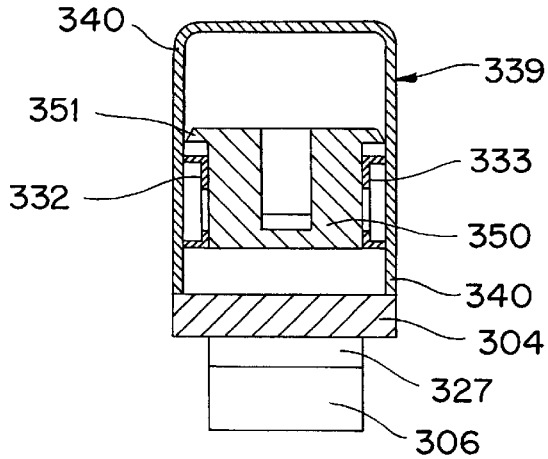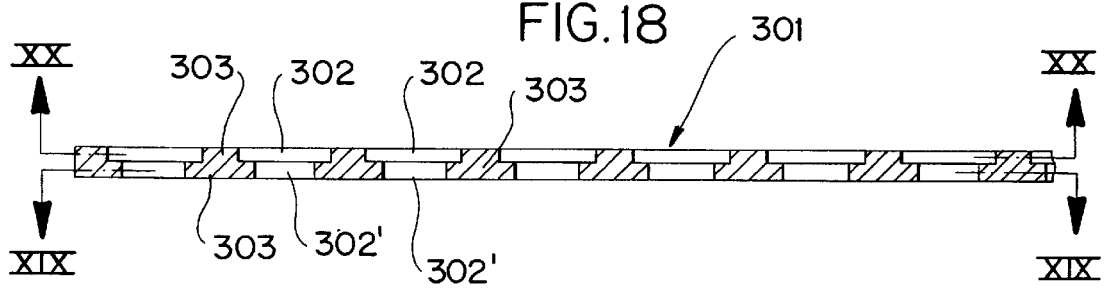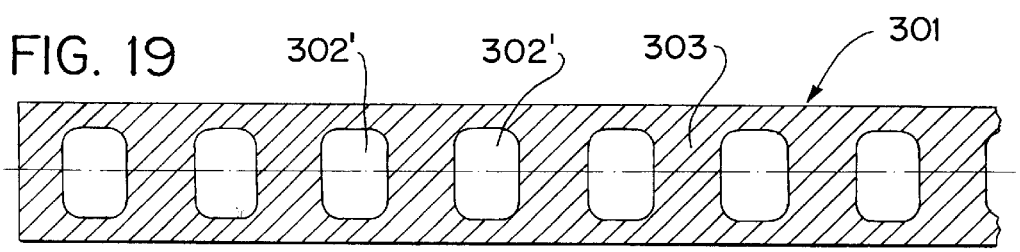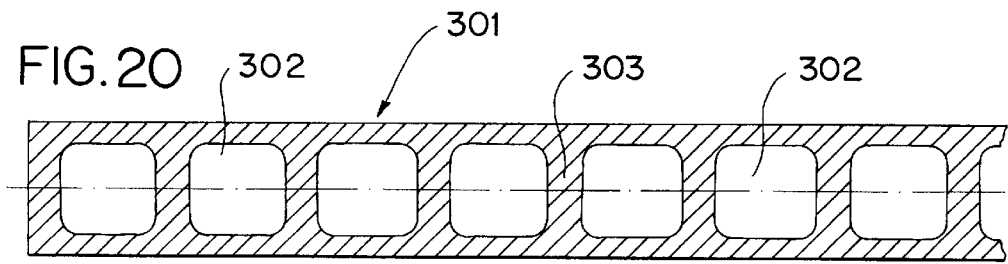

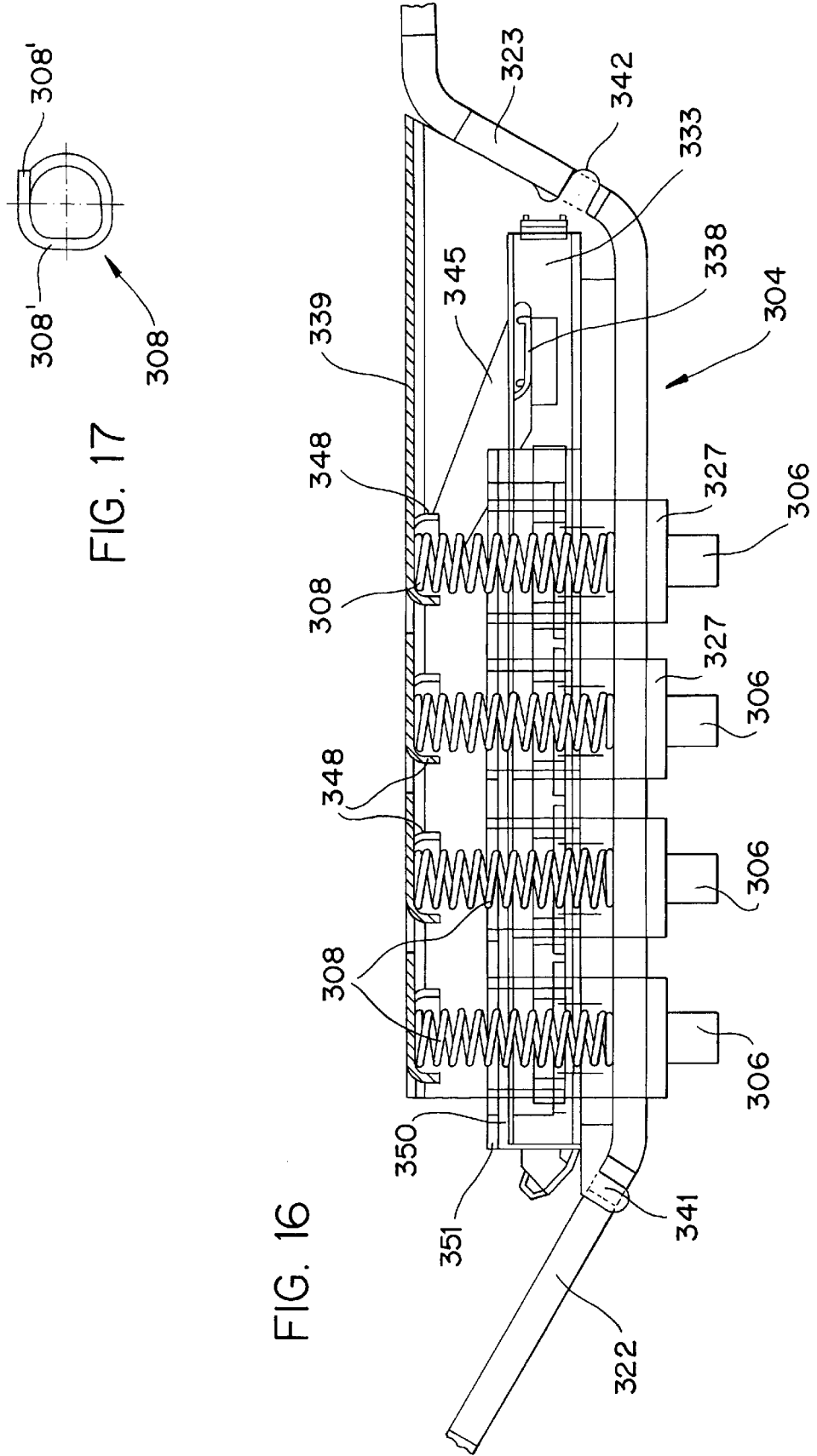

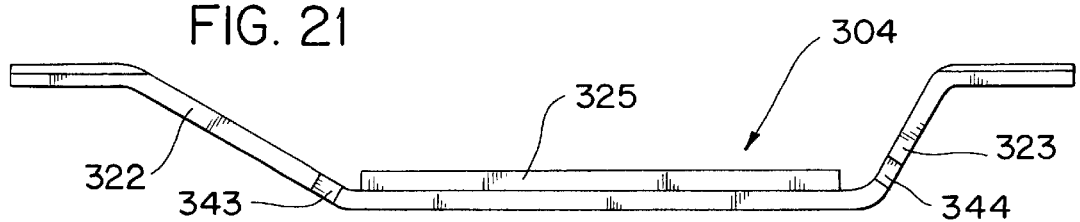
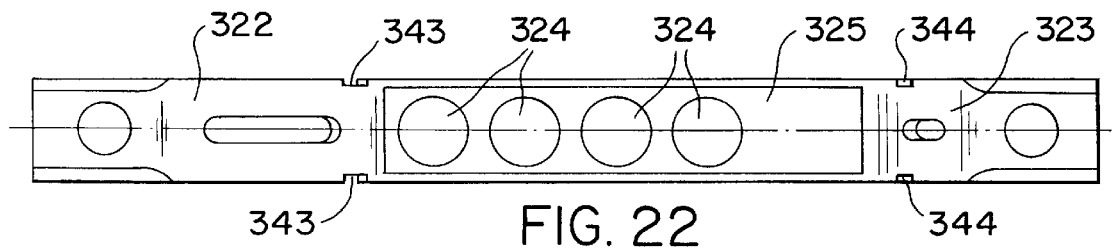
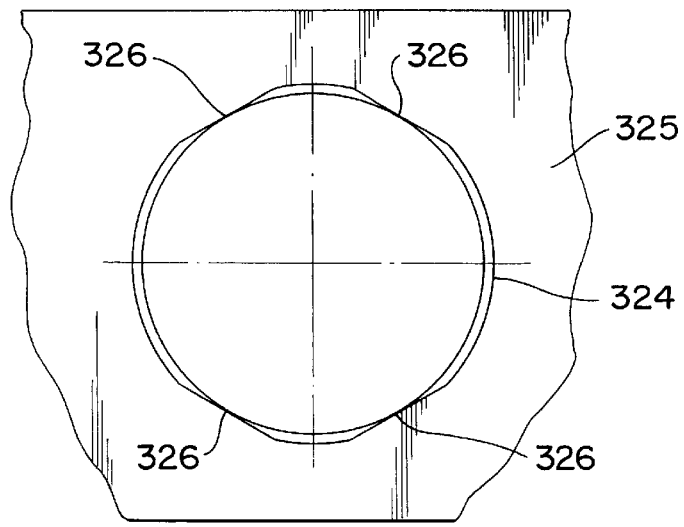
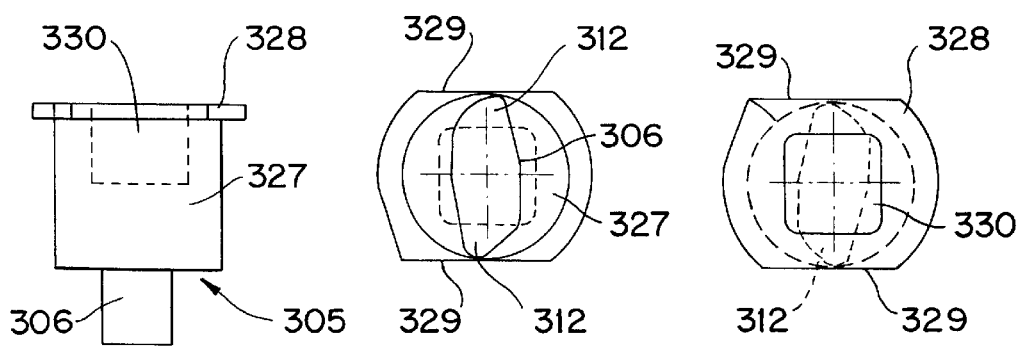

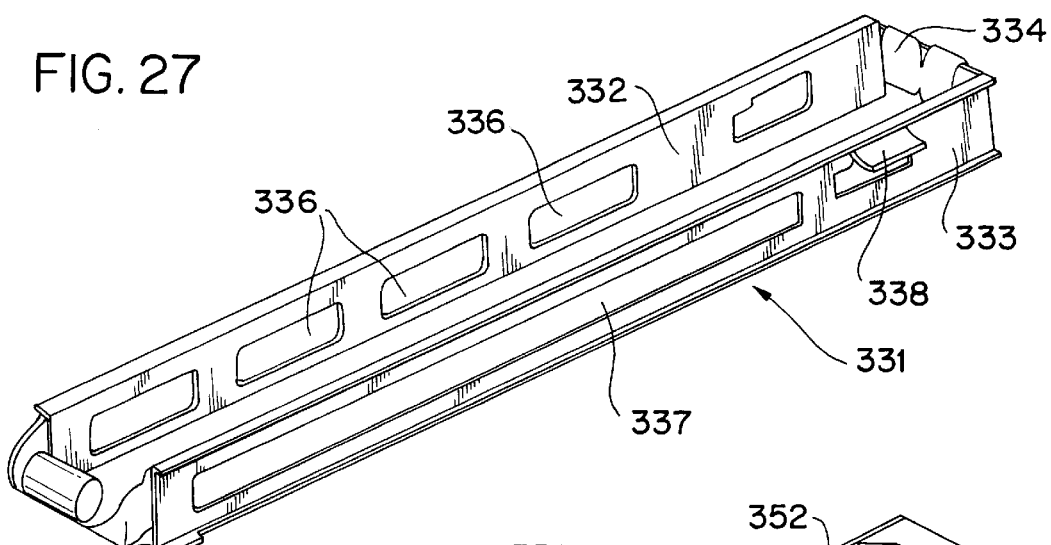
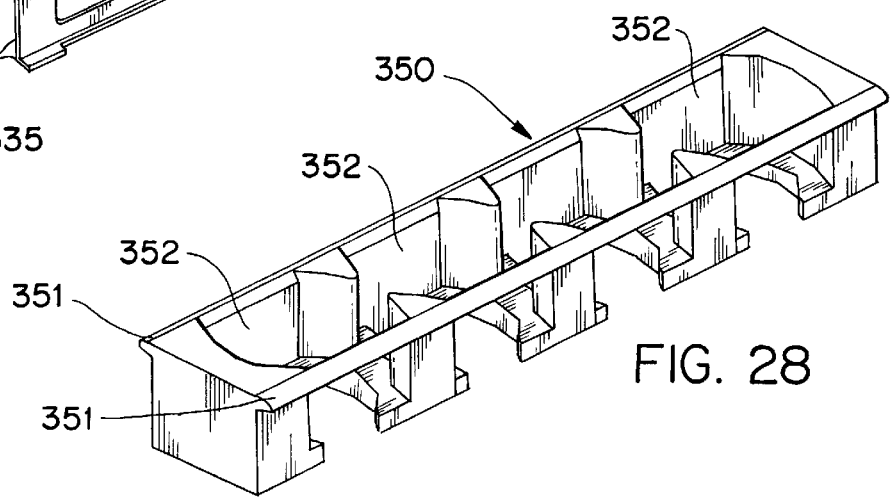
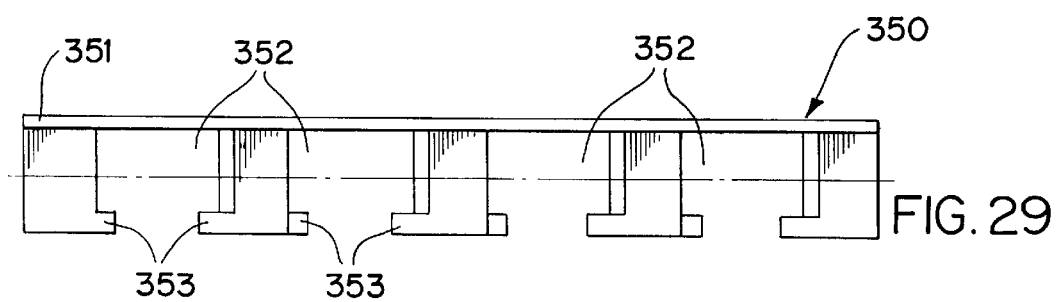
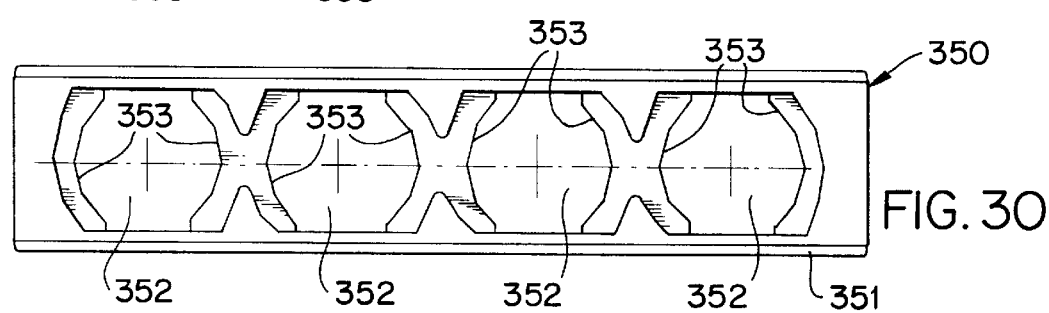

LOCKING DEVICE FOR VEHICLE SEATS

FIELD OF THE INVENTION

The present invention relates to a locking device for vehicle seats, especially seats of motor powered vehicles. Such locking devices are used primarily to lock the top rail of a pair of rails supporting the vehicle seat in any position within the adjusting range, in a form-locking manner. The top rail is guided longitudinally slidably in a bottom rail connected with the vehicle body structure.

BACKGROUND OF THE INVENTION

In known vehicle seat locking devices, for continuous longitudinal adjustability of the seat, a capacity to be locked without play in any position within the longitudinal adjusting range requires a wedge-shaped or conical contact surface on the locking bolt. The locking bolt, dependent upon its alignment with the detent openings, must then penetrate more or less deeply into the detent openings, until the contact surface engages the boundary surface of the detent opening which is to receive the locking bolt. Disadvantageously, the structural requirements for snapping the locking bolt arrangement into the detent opening is relatively great. Additionally, when the detent openings are provided in a rail, the locking bolt ends project outwardly for a distance beyond the rail, causing other interference. Further, not in the least on account of the different depths of penetration of the bolt, a form-locking security mechanism holding the locking bolt in its locking position cannot be realized in a simple manner. Thus, in a practical sense, only automatic locking is available as means to prevent lifting of the locking bolt out of the detent opening in case of overloading, as can occur in case of a crash.

SUMMARY OF THE INVENTION

Objects of the present invention are to provide a locking device for vehicle seats which avoids the aforementioned drawbacks of the known vehicle seat locking devices.

The foregoing objects are basically obtained by a locking device for vehicle seats comprising first and second parts which are continuously adjustably coupled. The first part has a plurality of first detent openings arranged in a row, each of the openings having a boundary surface. The second part has a plurality of spring-biased locking bolts arranged one behind another and aligned with the detent openings. The locking bolts are independently movable in a first direction relative to the second part between unlocking and locking settings. In the locking settings, the locking bolts penetrate the detent openings to a predetermined depth independently of one another, thereby locking releaseably the parts against adjustment without any play in adjusting directions. Each of said locking bolt has at least a first portion thereof movable in a second direction independently of movement of the locking bolts in said first direction such that a surface area thereof contacts one of the boundary surfaces without play and without varying the predetermined depth of locking bolt penetration into one of the detent openings.

Each locking bolt or at least one of its parts incorporates mobility for penetrating into one of the detent openings, and also has mobility by which a surface area of the locking bolt provided for play-free contact on the boundary surface is brought into contact on the boundary surface without modifying the penetration depth of the locking bolt in the detent opening. Thus, a uniform depth of penetration of all the bolt elements is attained, and each locking bolt can be constructed so that the ends of the bolts do not project out or only minimally project out of the detent openings. Furthermore, the locking bolts, by virtue of their snap-fitting penetration into the detent openings, remain uniform in penetration depth. Thus, in a very simple manner the locking bolts allow for securing by form-locking, countering any possible movement out of the detent openings.

Such a locking device can be constructed in various manners. For example, at least the end segment of the locking bolt, which engages in the locking setting in one of the detent openings, can have a cross section with the edge at least on one part of the periphery where the spacing from the locking bolt longitudinal axis, between its smallest distance from the longitudinal axis and its greatest distance from the longitudinal axis, uniformly and progressively becomes greater. The end segment requires only a rotation of the locking bolt to bring the outer surface of this cam-like segment into contact on the boundary surface of the detent opening. In addition to the mobility for snapping or penetrating into one of the detent openings, the locking bolt also demonstrates a different type of mobility, which is its rotatability. The cam-like segment can be configured integral with the other, preferably bolt-shaped element of the locking bolt, or can be securely attached to this part. In general, a half-diameter suffices for the bolt-shaped part, which is smaller than the greatest distance of the edge of the cam-like segment from the locking bolt longitudinal axis, and for example, is identical to the smallest distance of this edge from the locking bolt longitudinal axis. Of course, it is also possible to configure the diameter of the bolt-shaped part as double the greatest distance of the edge from the locking bolt longitudinal axis.

The cam-like segment can also be configured to be rotatable around the locking bolt longitudinal axis on a cylindrical segment of the other part of the locking bolt. If this other part is configured in the form of a bolt, the cam-like part can be mounted thereon so that only the cam-like part carries out the additional rotary movement. Likewise it is possible to arrange the cam-like segment engaging rotatably in the detent opening and axially slidably on the other locking bolt part.

The elimination of play resulting from the additional movement can also be accomplished by the locking bolt, following snapping or penetrating into one of the detent openings in the row of detent openings, being thrust transversely until it comes into contact on the boundary surface of the detent opening. For this purpose, means must also be provided to form a guide allowing such transverse thrusting, to cause this transverse thrusting and to allow working forces to be absorbed in the direction of this transverse thrusting. These means can be formed by a cam, which can be configured similarly to the aforementioned cam-like segment, and can engage an abutting surface. If the cover surface of this cam is constructed so that the contact on the abutting surface is self-impeding or self-locking, this cam can also absorb the cited stress.

Another possible way to eliminate play by additional mobility of at least a part of the locking bolt resides in providing at least one wedge. The wedge is movable relative to the bolt part of the locking bolt in the snapping-in direction and is arranged so that, upon release of the locking bolt for movement into the locking setting, this wedge falls into the intermediate chamber or space between the bolt part and the boundary surface of the detent opening. The wedge can also be spring-biased in the same manner as the bolt member. If the part of the locking bolt snapping into the detent opening is in the form of a bolt, the wedge can be constructed from a segment of a ring mounted longitudinally slidably on this bolt. The ring forms a tapered cone aligned in the direction of penetration of the locking bolt. It is especially advantageous when the wedge is adapted to the shape of the portion of the boundary surface of the detent openings forming the contact surface for the wedge. If this contact surface is semi-cylindrical, then a conical wedge surface is favorable. However, if this contact surface is flat, it is expedient to also embody the wedge surface as a flat surface, which of course is also possible when the part forming the wedge has a cylindrical bore as a seat and mounting surface. Despite a cone or wedge angle lying in the self-impeding area, when there is a relatively large width gap between the locking bolt part snapped into the detent opening and the boundary surface of the detent opening, it is also possible for it to come out of its setting with a relatively small thrust movement of the part forming the wedge, if this part is configured in at least in two parts, whereby each of the two parts incorporates a wedge or cone.

If a rotary movement is provided as the additional movement or is used to cause the additional movement, an identical direction of rotation can be provided for all of the locking bolts when a cam-like end segment or part is used. This end segment or part has two diametrically opposite areas of the edge of its transverse section for each of which the distance from the longitudinal axis becomes progressively greater in the same direction around the periphery. Then two diametrically arranged cams are accessible. In a simple manner, it is guaranteed that one of the locking bolts found in the locking setting prevents any adjusting movement of the parts locked with one another in the one adjusting direction and a different locking bolt in the other adjusting direction prevents any play. Preferably, the two diametrically opposite segments of the edge area are in radial symmetry around the longitudinal axis.

It is advantageous to provide a spiral-shaped path for the edge.

In order to prevent undesired rotation of the locking bolts or the cam-like parts in their locking setting, it is possible to select the gradient at each point of the segment of the edge having a continuously increasing distance from the longitudinal axis, so that its angle of the edge at the contact point with the boundary surface of the detent opening lies in the self-impeding or self-locking range. For this purpose, for example, a logarithmic spiral is suitable. At any rate, undesired rotation would lead only to a slight thrustability of the locked structural parts. Besides, the locking would remain completely effective. The danger that the locking bolts would inadvertently come out of the detent openings, for example, as a result of excess load, is already eliminated, in that the loaded surface of the part of the locking bolt carrying the load (i.e., the outer cover surface of the end segment of a bolt engaging in the detent openings or the outer surface of the cam-like segment) extends parallel to the direction of penetration. Therefore, the load forces, which work on the locking bolt, produce no components in the direction of penetration. It is possible, however, to secure the locking bolt additionally in a form-locking manner against any movement out of the locking setting by means of an obstruction. The obstruction can be constructed very simply, since a simple movable blocking element fitted transverse to the locking bolt thrusting direction is all that is needed for that locking bolt. In its locked setting, the blocking element can engage the end of the locking bolt most distant or remote from the detent opening.

One preferred exemplary embodiment saves considerable space, and provides locking without any play in either direction and the capacity to obtain any desired setting. Only four locking bolts are required. Furthermore, it is advantageous that the locking can be released with a very simple mechanical arrangement.

Other objects, advantages and salient features of the present invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure:

FIG. 7 is an partial side elevational view of a locking bolt according to a second embodiment of the present invention;

FIG. 8 is a bottom plan view in section along line VIII—VIII of FIG. 7;

FIG. 9 is a partial, side elevational view in section of a locking bolt according to a third embodiment of the present invention;

FIG. 10 is a side elevational view of the locking bolt of FIG. 9 in a locking setting;

FIG. 11 is a top plan view in section taken along line XI—XI of FIG. 10;

FIG. 14 is an enlarged, end elevational view in section taken along line XIV—XIV of FIG. 13;

FIG. 15 is an enlarged, end elevation view in section taken along line XV—XV of FIG. 13;

FIG. 16 is a partial, side elevational view in section of the locking device of FIG. 12;

FIG. 17 is a plan view of one end of one of the springs biasing the locking bolt of the locking device of FIG. 12;

FIG. 18 is a partial, side elevational view in section of a flat rail having detent openings of the locking device of FIG. 12;

FIG. 19 is a top plan view in section taken along line XIX—XIX of FIG. 18;

FIG. 20 is a bottom plan view in section taken along line XX—XX of FIG. 18;

FIG. 21 is a side elevational view of the holder incorporating the guide passages for the locking bolts of the locking device of FIG. 12;

FIG. 22 is a top view of the holder of FIG. 21;

FIG. 23 is an enlarged, partial top plan view of the holder of FIG. 21;

FIG. 24 is a side elevational view of one of the locking bolts of the locking device of FIG. 12;

FIG. 25 is a bottom plan view of the locking bolt of FIG. 24;

FIG. 26 is a top plan view of the locking bolt of FIG. 24;

FIG. 27 is a perspective view of the slide of the locking device of FIG. 12;

FIG. 28 is a perspective view of the lifting body of the locking device of FIG. 12;

FIG. 29 is a side elevational view of the lifting body of FIG. 28;

FIG. 30 is a top plan view of the lifting body of FIG. 28;

DETAILED DESCRIPTION OF THE INVENTION

Figure 1:
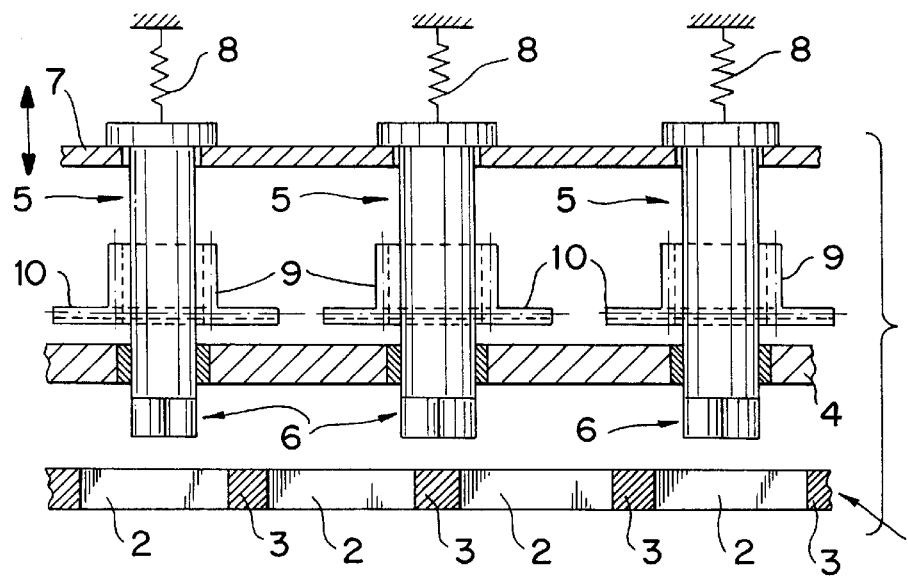
FIG. 1 is a partial, diagrammatical side elevational view in section of a locking device, with all of the locking bolts in an unlocking setting, according to a first embodiment of the present invention.

Referring initially to FIGS. 1–6, two parts of a vehicle seat which are continuously adjustable relative to one another, for example the top and bottom rails of a pair of seat rails, are lockable in any setting within the adjusting range in a form-locking manner and without play by a locking device according to a first embodiment of the present invention. The locking device comprises one rail 1 securely connected with one of the two parts to be locked with one another or can be formed by one of these two parts. Rail 1 is provided with a row of identically configured detent openings 2 arranged along the rail longitudinal direction. Between each two detent openings 2, in series one directly behind the other, a crosspiece 3 is provided. All of the crosspieces 3 are identical.

On the other of the two parts to be locked together is a holder 4 for three identically constructed locking bolts 5. Bolts 5 are arranged one behind the other in the direction of alignment of rail 1 with identical spaces between them such that they are all aligned on the area formed by detent openings 2 and crosspieces 3. The longitudinal axis of the holder extends perpendicular to the side of rail 1 closest to it.

The dimensions of detent openings 2, the width of crosspieces 3 and the arrangement of locking bolts 5 are determined in a known manner, so that in any setting of rail 1 relative to holder 4 two of the locking bolts 5 can engage in two of the detent openings 2. In the setting shown in FIGS. 1 and 2, the two exterior locking bolts 5 can engage each in one of the detent openings 2, whereupon the middle locking bolt 5 is aligned with one of the crosspieces 3.

Figure 2:
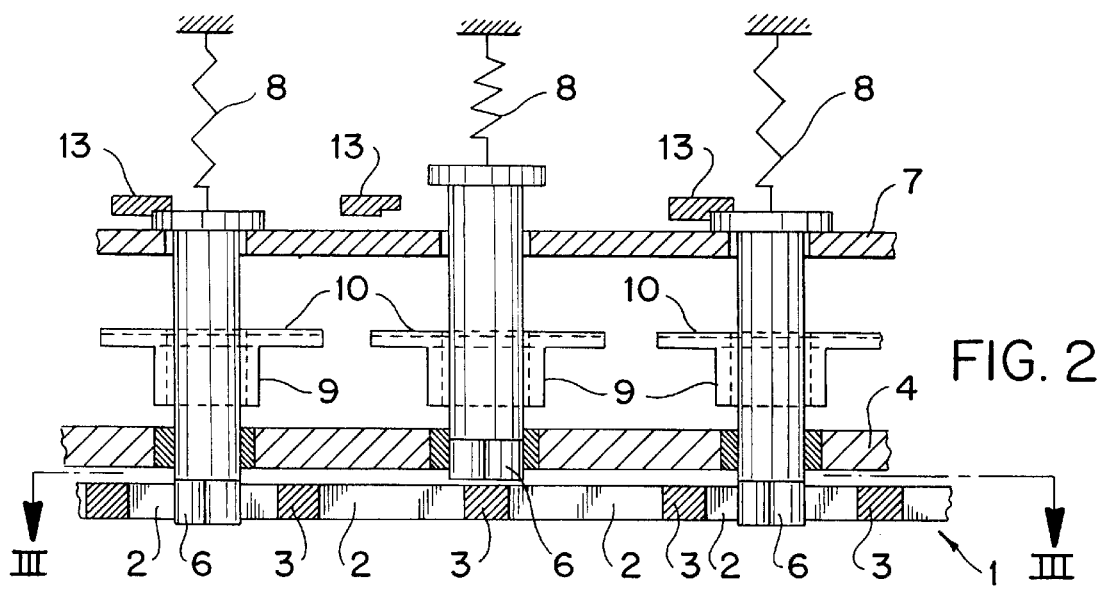
FIG. 2 is a side elevational view in section of the locking device of FIG. 1, with two of the locking bolts in a locking setting.

Locking bolts 5 are configured as cylindrical bolts down to the end segments 6 and are longitudinally slidable and rotatable in a mounting or a borehole of holder 4. End segments 6 are provided for engagement in detent openings 2. A lifting device 7 is provided for moving all of the locking bolts 5 together into their unlocking setting shown in FIG. 1, and for releasing them together for a locking movement. As shown in FIGS. 1 and 2, lift device 7 is formed in the first embodiment by a lifting rail movable in the longitudinal direction of locking bolts 5, and extends parallel to holder 4 and rail 1. This lifting rail is provided with bores for the passage of locking bolts 5. The locking bolts can engage with a head on the side of the lifting rail remote from holder 4. A prebiased spring 8 presses against the head of each of the locking bolts 5 with a force directed against rail 1.

A sprocket 9 is securely arranged on each of the locking bolts 5, in that segment which regularly lies between holder 4 and lifting device 7. Whatever the setting of locking bolt 5, each sprocket 9 meshes with a toothed rack 10. Toothed racks 10 are slidable independently from one another, and together with the associated sprockets 9 form rotary drives. Instead of this sort of rotary drive, a differently configured rotary drive, for instance a pivoting arm projecting radially outwardly from locking bolt 5, could be provided.

For adjustment of the parts normally locked with one another, in other words for sliding rail 1 in its longitudinal direction relative to locking bolt 5, first all locking bolts 5 must be moved against the force of the springs 8 biasing them into the unlocking setting shown in FIG. 1. This movement occurs by means of the lifting device 7, which can slide in the longitudinal direction of locking bolts 5. It is assumed that following the longitudinal adjusting of rail 1 and holder 4, middle locking bolt 5 is aligned with one of the crosspieces 3. The two other locking bolts 5 are each then aligned on one of the detent openings 2. If the lifting device 7 is now freed, springs 8 thrust locking bolts 5 against rail 1. Lifting device 7 is moved simultaneously in the same direction. Middle locking bolt 5 comes into contact on one of the crosspieces 3. The two other locking bolts 5 each penetrate into one of the detent openings 2, but only so far that they do not extend beyond or in any case only slightly beyond the side of rail 1 remote from lifting device 7. All locking bolts 5 in locking setting penetrate to the same depth. Toothed racks 10 do not prejudice this longitudinal thrusting of locking bolts 5, since their teeth as well as those of sprockets 9 run or extend parallel to the direction of thrust of locking bolts 5.

As shown in FIGS. 3 to 6, end segments 6 of locking bolts 5 have in cross section an edge having two segment cutouts radially symmetrical to the longitudinal axis of locking bolt 5. In the embodiment shown, one half of the edge is radially symmetrical to the other half.

Figure 4:
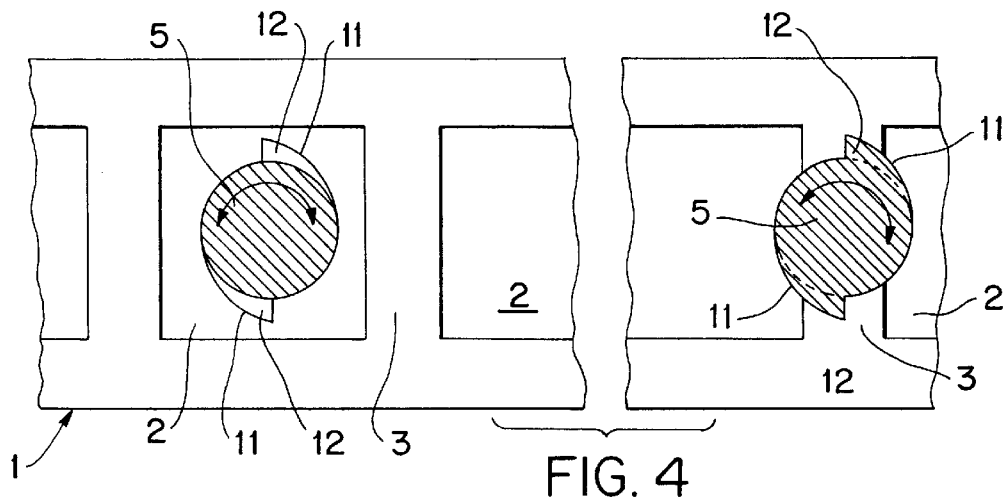
FIG. 4 is an enlarged view of a portion of FIG. 3.
Figure 6:
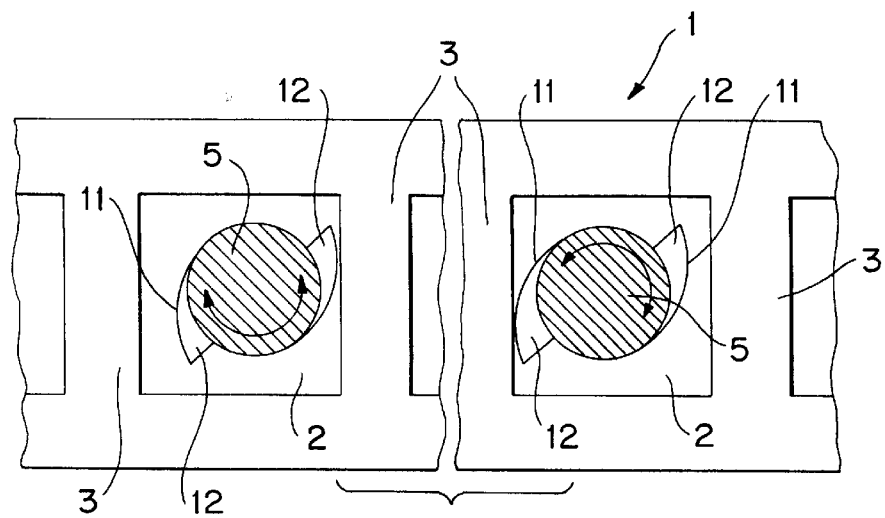
FIG. 6 is an enlarged view of a portion of FIG. 5.
Figure 12:
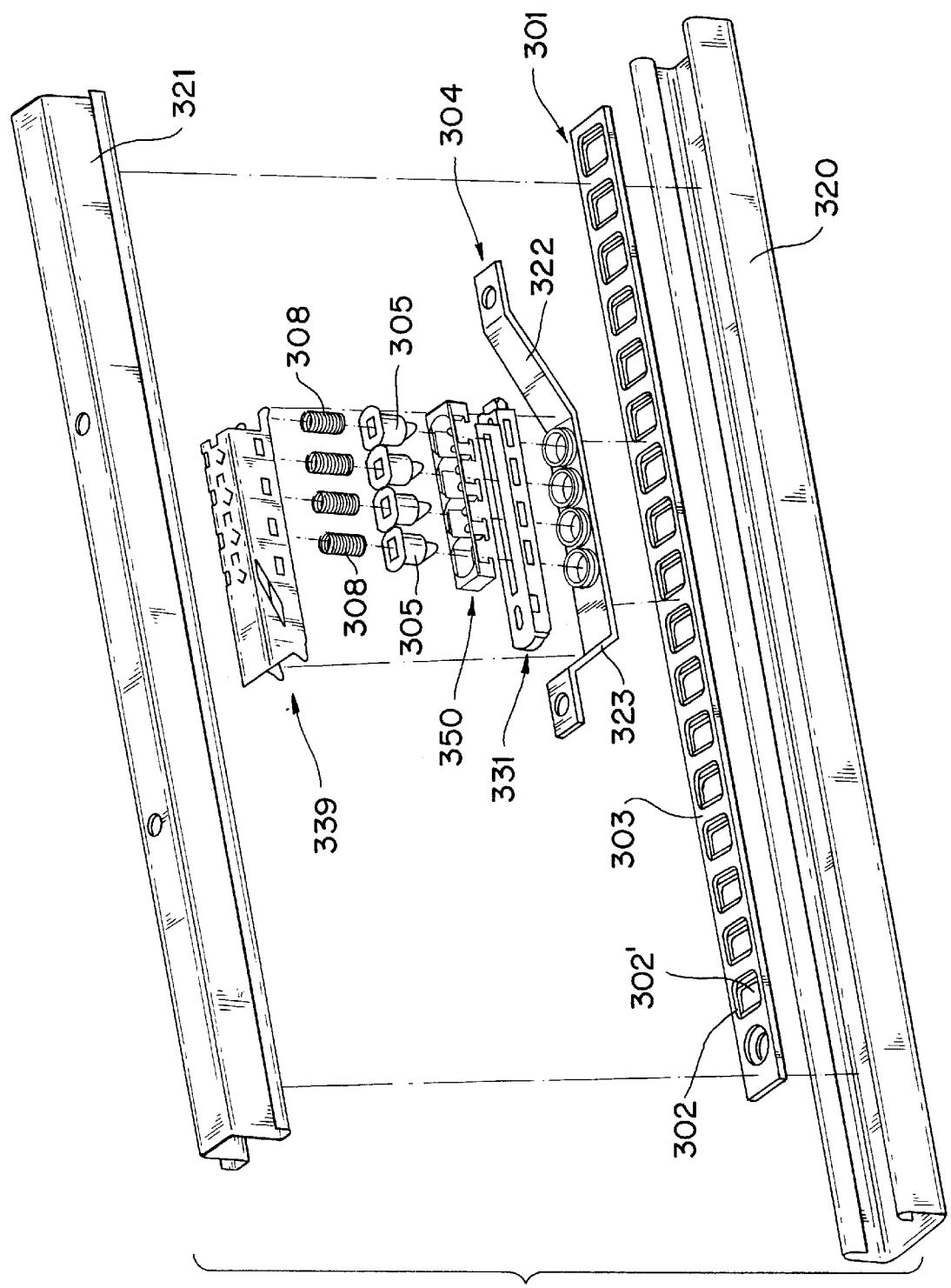
FIG. 12 is an exploded view perspective view of a locking device according to a fourth embodiment of the present invention, with a pair of rails being lockable.
Figure 13:
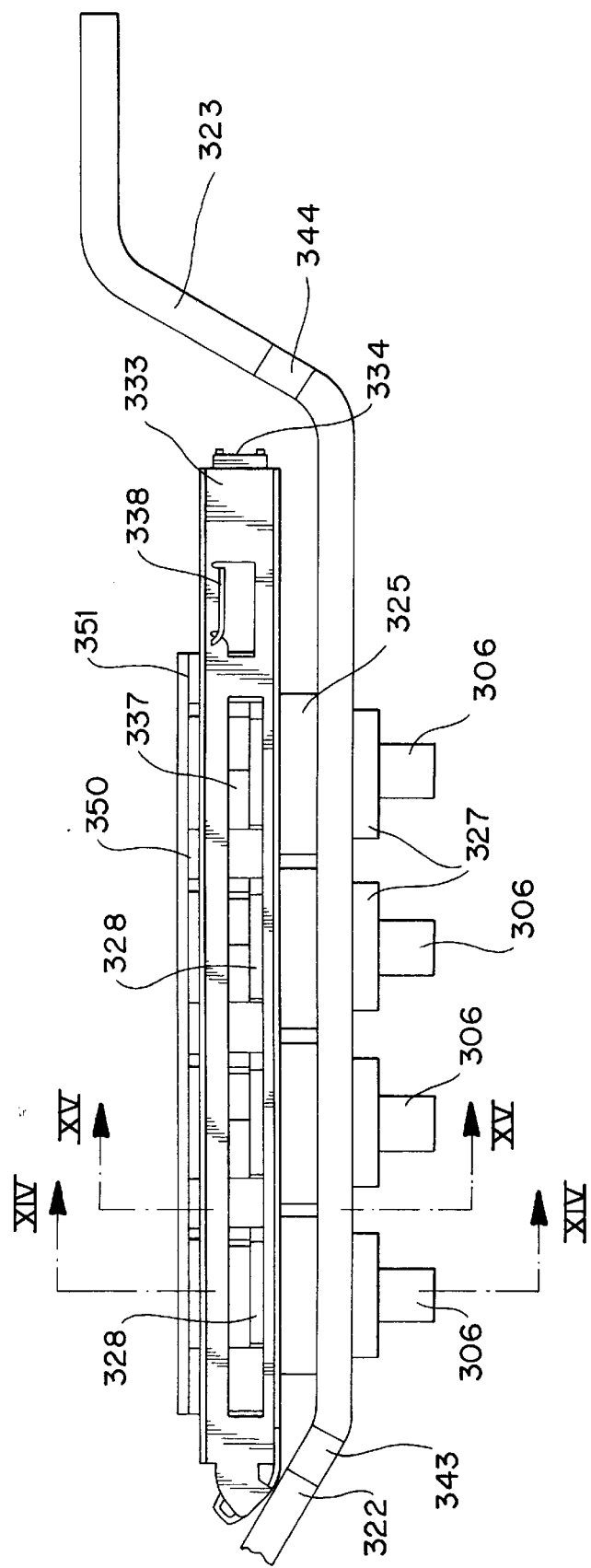
FIG. 13 is an enlarged, side elevational view of the locking device of FIG. 12.

As shown especially in FIGS. 4 and 6, the two halves of the edge extend from two diametrically opposite points which are defined on the circle formed by the cylindrical part. Each half extends along the path of a logarithmic spiral 11 with the same direction of circulation relative to one another such that the two likewise diametrically arranged points are provided at which spirals 11 are at the greatest distance from the longitudinal axis of locking bolt 5. These points are offset relative to the starting points of the logarithmic spirals 11 in direction of circulation, for instance by ninety degrees. The logarithmic spirals 11 are rounded off and then proceed into a segment joining this rounding off with the starting point of the other spiral 11. End segments 6 thus form two diametrically opposite cams 12, of which one side follows the logarithmic spiral 11.

Figure 3:
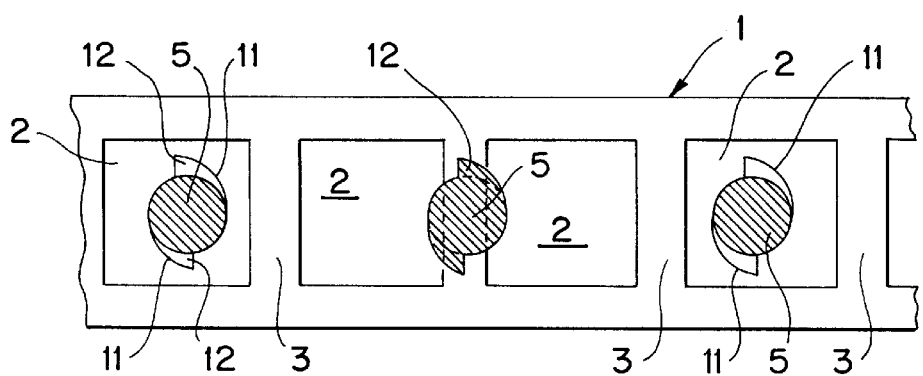
FIG. 3 is a top plan view in section taken along line III—III of FIG. 2.
Figure 5:
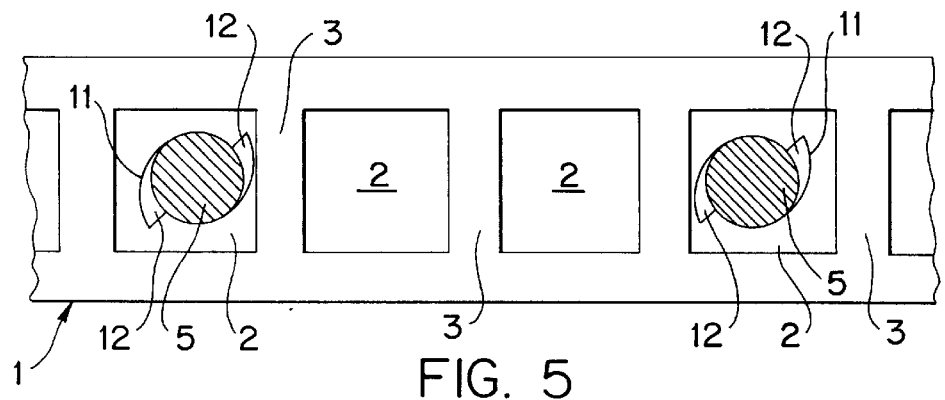
FIG. 5 is a top plan view in section corresponding to FIG. 3, but with a rotary setting of the locking bolt corresponding to a locking setting.

After the two exterior locking bolts 5 penetrate into detent openings 2, as shown in FIG. 2, all locking bolts 5 are rotated clockwise, as indicated in FIG. 3, while toothed racks 10 are moved to the right in the arrangement as shown in FIG. 2. This rotary movement, as shown in FIGS. 5 and 6 causes one cam 12 on the locking bolt 5 shown on the left in FIG. 2 to contact with its spiral side on the crosspiece 3 which is to the right of it. Locking bolt 5 shown on the right in FIG. 2, has its cam 12 contact crosspiece 3 found to the left of this locking bolt 5. As soon as the locking bolt 5 shown on the left has reached the locking setting shown in FIG. 5, it secures rail 1 without play against a thrusting to the left. The locking bolt 5 shown on the right secures rail 1 in its locking setting without play against a thrusting to the right.

Since the angle which includes cam 12 engaging on crosspiece 3 in the area of the contact surface with crosspiece 3 lies within the self-impeding area, a loading of rail 1 in its longitudinal direction does not lead to rotary movement of locking bolt 5. To ensure that the security of the locking would not be endangered when stress or load is applied on the rail in its longitudinal direction which would tend to cause a rotary movement of locking bolt 5, the relative movement occurring between rail 1 and locking bolt 5 would lead only to slight thrusting or sliding. In other words, sufficient thrusting is only obtained for the contact of crosspieces 3 on end segments 6 in the area of the beginning points of spirals 11.

Since the sides of cam 12 extend parallel to the longitudinal axis of locking bolt 5, no force components are present in the direction of the locking bolt longitudinal axis, when there is stress or loading of locking bolt 5 in the longitudinal direction of rail 1. Locking bolts 5 thus cannot be inadvertently pressed out of detent openings 2. However, it is possible, as shown in FIG. 2, to secure locking bolt 5 in the locked setting, form-locking against a movement into the unlocking setting. For this purpose, only a blocking element 13 need be associated with each locking bolt 5. The head of locking bolt 5 engages the blocking element in its blocking setting. Such a blocking element 13 can, for example, be formed by a rocking lever, which can be moved into the thrust or slide path of the head of the associated locking bolt 5, when locking bolt 5 is in its locking setting.

If locking bolt 5 is not only rotatably, but also transversely slidably longitudinally in holder 4, its end segment 6 could be cylindrical. The transverse thrusting or sliding could then be accomplished with the aid of cams on locking bolts 5. With rotary movement of locking bolt 5, the bolts can engage on abutting surfaces and thus thrust the associated locking bolt 5 away from this abutting surface. If such a cam would be mounted rotatably on locking bolt 5, and for its rotary drive be configured with a segment forming a sprocket, then only a rotary movement of the cam would be required, and not a rotary movement of the locking bolt. This then, especially the area of its end segment penetrating into the detent openings, could have a cross sectional shape deviating from the circular shape. This end segment could be adapted to the shape of the contact surfaces of the detent openings for the locking bolts, and thus, for example, could have flat surfaces.

FIGS. 7 and 8 show an embodiment of a locking bolt 105 which differs from the embodiments shown before in that the cam-like part 106 is arranged rotatably on the bolt-like part 106' of locking bolt 105. In addition, cam-like part 106 can be mounted axially slidably on bolt-like part 106'. Since bolt-like part 106' must absorb the forces arising from stress involved with the locking, while cam-like part 106 provides the freedom from play in the locking arrangement, it is possible to consider separation of the two functions or distribution of the two functions on two structural parts.

If cam-like part 106 is only rotatable, but cannot slide axially in its arrangement on bolt-like part 106', with release of the locking device, both fall under the force of a prebiased spring into one of the detent openings, as is also shown in FIGS. 1 to 6. If, on the other hand, the cam-like part 106 is longitudinally slidable on bolt-like part 106', a separate spring is required for cam-like part 106. No additional lifting device is needed, however, for lifting out of detent openings, because bolt-like part 106' can be provided with a catch or carrier for cam-like part 106.

For the rotary movement of cam-like part 106, a sprocket 109 can be attached to its end remote from the rail and connected securely with it. Sprocket 109 meshes a toothed rack, as shown in FIGS. 1 to 6.

The contour of cam-like part 106 can be the same as the contour of end segment 6 of the locking bolt, as shown in the first embodiment. Also, with reference to further individual features, for example the arrangement of the locking bolt relative to the rails and their detent openings, there are no differences between this embodiment and the first embodiment. Likewise, a security arrangement can be provided against any undesired axial sliding of bolt-like part 106', while no axial components react in any way to loading or stresses of the locking device on bolt-like part 106'.

FIGS. 9 and 10 diagrammatically partially show a third embodiment of the present invention in an unlocked or a locked state. This third embodiment differs from the embodiment of FIGS. 1 to 6 only by the provision of other means on the locking bolt to eliminate play which is explained only relative to relevant differences. For the other features, references correspond to the first embodiment.

In this third embodiment, rotatability is not required as additional mobility capacity. Each locking bolt 205 in this case comprises a rod-like part 206' to accomplish the locking, and a two-part structure 206 to provide freedom from play in the locking arrangement. The rod-like parts 206' of locking bolts 205 have the same arrangement relative to one another and to rail 201, which is constructed the same as rail 1 in the embodiment of FIGS. 1 to 6. Rod-like parts 206', however, need not be cylindrical bolts, since they are subject to no rotation. On the other hand, their cross sections could also have a polygonal edge.

Structure 206 in the third embodiment comprises an interior wedge body 214 and an exterior wedge body 215. Interior wedge body 214 is longitudinally slidable on rod-like part 206', and for this purpose is provided with a central passage bore. Its exterior profile in the third embodiment is rectangular, but it could also be circular. As shown in FIG. 9, the two side pieces of interior wedge body 214 extend transverse to the rails. On a part of their lengths seen in longitudinal alignment of rod-like part 206', each forms a wedge surface 214' tapering toward the end of rod-like part 206' coming into engagement with detent openings 202. The wedge surfaces are inclined in relation to the longitudinal alignment of rod-shaped part 206' and point downward toward rail 201. These wedge surfaces come in contact on crosspieces 203 and obtain freedom from play in the locking, as is shown in FIG. 10. Since these wedge surfaces are flat surfaces, a linear contact with crosspieces 203 is formed. If the wedge surfaces were formed of a conical surface, there would be only one point of contact with straight crosspieces.

Exterior wedge body 215 is mounted on the exterior cover surface of interior wedge body 214, slidably in longitudinal alignment with rod-like part 206'. Wedge body 215 has a central clearance which is adapted to the exterior profile of interior wedge body 214. The exterior profile of exterior wedge body 215, as shown in FIG. 11, is likewise rectangular. As is to be assumed from FIGS. 9 and 10, exterior wedge body 215 comprises segments extending transverse to the rail and constructed with wedge surfaces 215'. The inclined wedge surfaces 215 extend parallel to the adjacent wedge surfaces 214'. Wedges surfaces 215' as well as wedge surfaces 214' have wedge angles lying within the self-impeding area, so that wedge bodies 214 and 215 cannot come out of engagement with detent openings 202 as a result of load or stress being applied in rail longitudinal direction. The number of wedge bodies required depends upon the available maximum thrust or slide movement and upon the maximum dimensions of the gap width to be bridged between rod-like part 206' and adjacent crosspiece 203. Wedge surfaces 215', as shown in FIG. 10, come into use then when the gap width is greater than the maximum thickness of wedge surface 214' measured in the rail longitudinal direction.

The two wedge bodies 214 and 215, as well as rod-shaped part 206', are spring-biased against rail 201. With release of the locking device for the changeover into locked state, rod-shaped part 206, when it is aligned on one of the detent openings 202, is brought into the locking setting shown in FIG. 10, in which the free end of rod-shaped part 206' does not project beyond or projects not far beyond the bottom of rail 201. Insofar as neither of the wedge bodies 214 and 215 can penetrate into this detent opening 202, exterior wedge body 215 comes into contact on one of the crosspieces 203, while interior wedge body 214 penetrates into the gap between rodshaped part 206' and crosspiece 203 until it engages on crosspiece 203 and thus the locking is free of play. If rod-shaped part 206' cannot snap into one of the detent openings 202, then, like one or both of the wedge bodies 214 and 215, it comes into contact on top of one of the crosspieces 203.

All of the rod-shaped parts 206' of locking bolt 205 are raised up together, as in the first embodiment, by means of a lifting device 207. So that wedge bodies 214 and 215 will also be raised, both have inwardly projecting carrying pins engaged in longitudinal grooves of rod-shaped part 206' or of interior wedge body 214 and are embodied so that the movement relative to rod-shaped part 206' is not hindered in the direction of penetration into the detent openings.

The fourth embodiment of the locking device of the present invention shown in FIGS. 12 to 33, is constructed to be built into the seat rail. The locking device comprises a bottom rail 320 to be connected with the vehicle body and a top rail 321 guided longitudinally slidably in the bottom rail and to be connected with the body of the seat. The locking device allows for continuous longitudinal setting of the vehicle seat without play, and a form-locking of top rail 321 with bottom rail 320 in any desired setting within the adjusting range.

In the interior of bottom rail 320, a flat rail 301 is fastened to its yoke part. Rail 301 is provided with a row of pairs of detent openings 302, 302' arranged in longitudinal alignment along the rails. Directly between each two pairs of detent openings 302, 302' in sequence one after the other a crosspiece 303 is mounted. All of the crosspieces 303 are configured to be identical to one another. As particularly shown in FIGS. 12 and 18, detent openings 302 are arranged in a top plane and are each aligned with one of the detent openings 302' arranged in a bottom plane. Each of the detent openings 302 and 302' extends through half the thickness of flat rail 301, and has a cross sectional profile in the form of a rectangle with rounded corners. The dimensions in transverse direction of flat rail 301 are identical for all detent openings 302 and 302'. On the other hand, the lengths measured in the rail longitudinal direction of the detent openings 302 adjacent the top plane turned toward top rail 321 are greater than the corresponding lengths of the detent openings 302' adjacent the bottom plane.

The part of the locking device to be connected with top rail 321 has a holder 304 for all of the locking bolts 305. This holder 304 comprises a hanger bent out of a flat rail. One holder side piece 322 forms a guide surface ascending at an angle of thirty degrees. The end segment of side piece 322, the same as the end segment of the other more rigid side piece 323, can be placed on the bottom of the yoke part of top rail 321 and is securely connectable with rail 321. The yoke part of the hanger is provided with four guiding passages 324 arranged one after the other longitudinally along the yoke part. Into each guiding passage 324 is guided one of the locking bolts 305 rotatably and axially slidably. For the purpose of axial lengthening of guiding passages 324, as shown in FIG. 21, a flat strip 325 is welded onto the yoke part of the hanger. As shown in FIG. 23, the four identical guiding passages 324 have cross sectional profiles in the form of a circle with four flattened areas 326. Areas 326 lie symmetrical both to the longitudinal alignment of flat strip 325 and also to its transverse alignment, and define two wedges. One wedge tapers in the direction of the one end, and the other wedge tapers in the direction of the other end of flat strip 325. Each two guiding passages 324 are arranged directly one behind the other, are identical distances from one another, and are selected so that in any desired longitudinal setting of top rail 321 within its adjusting range, two of the four locking bolts 305 are each aligned on one of the pairs of detent openings 302 and 302' and there is at least the possibility that they may snap into respective detent openings 302.

As shown particularly in FIGS. 24 to 26, each of the identically constructed locking bolts 305 has a cylindrical middle section 327. The cylindrical middle section diameter is determined such that it has a bit of play in the guiding passage 324 carrying it. At the end of middle section 327 pointing down toward bottom rail 320, an end segment 306 is attached. End segment 306 forms two cams 312 radially symmetrical to the rotary axis of locking bolt 305. The boundary surface of the two cams 312, as shown in FIG. 25, has a spacing from the rotary axis of locking bolt 305 which becomes progressively wider from the beginning to the end of the cam. As is further shown in FIG. 25, the greatest diameter of end segment 306 is approximately identical to the diameter of middle section 327.

At the other end of middle section 327 a radially outwardly projecting flange 328 is attached. Flange 328 has a flattened area 329, where end segment 306 extends as far as the cover surface of middle section 327. The two flattened areas 329 are aligned parallel to one another and are tangent with the cover surface of middle section 327. The breadth of flange 328 is adapted to the bottom flattened area 329 shown in FIG. 25.

A central receiving passage 330, as shown in FIG. 26, penetrates from the contact side of flange 328 inward and into the middle section 327. Passage 330 has a cross section in the form of a square with rounded corners, and ends at some distance from the end segment 306.

Directly over flat strip 325 of holder 304, a slide indicated in its entirety as 331, is arranged. The slide is of sheet metal, and, as shown in FIG. 27, has two side rails 332 and 333 extending perpendicular to the plane defined by flat strip 325. The rails are connected rigidly with one another at both of their ends by a transverse connector member 334 or 335. Both the top and the bottom longitudinal edges of the two side rails 332 and 333 are angled outwardly which can also be seen in FIGS. 14 and 15. Side rail 332 is provided with four rectangular windows 336 arranged at some spacing from one another in their longitudinal direction. Each window is aligned with flange 328 of the locking bolt 305 and is of such dimensions that in the case of a rotary movement of locking bolt 305, flange 328 can penetrate through the associated window 336. Instead of windows 336, the other side rail 333 is provided with one longitudinal slot 337 passing through it, aligned with windows 336, through which can pass the flange 328 of any locking bolt 305.

On the end shown at the right in FIG. 27, one projecting guide tab 338 is bent outward at an angle out of both side rails 332 and 333. The tab's projection out from the side rail is greater than the outward projection of the bent edges.

Figure 31:
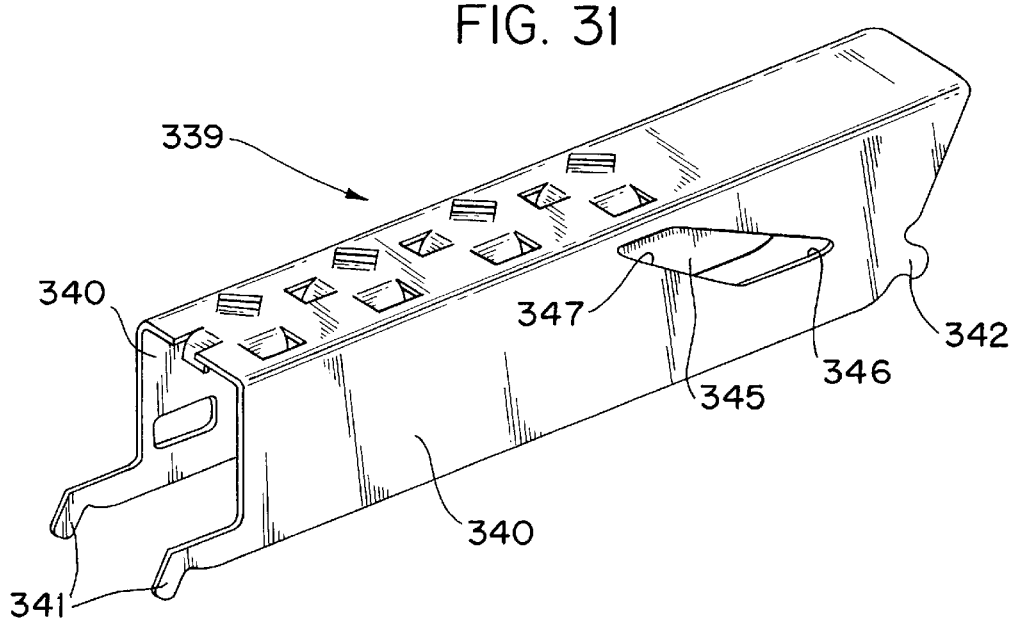
FIG. 31 is a perspective of the holding device of the locking device of FIG. 12.
Figure 32:
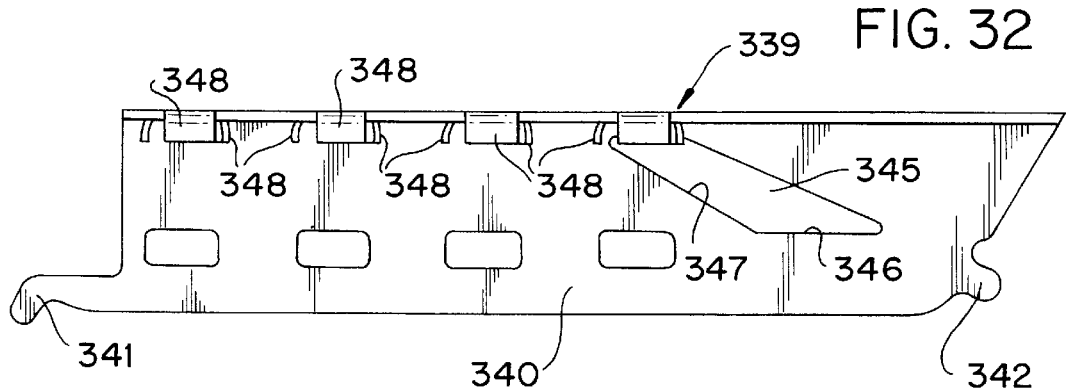
FIG. 32 is a side elevational view in section of the holding device of FIG. 31.
Figure 33:
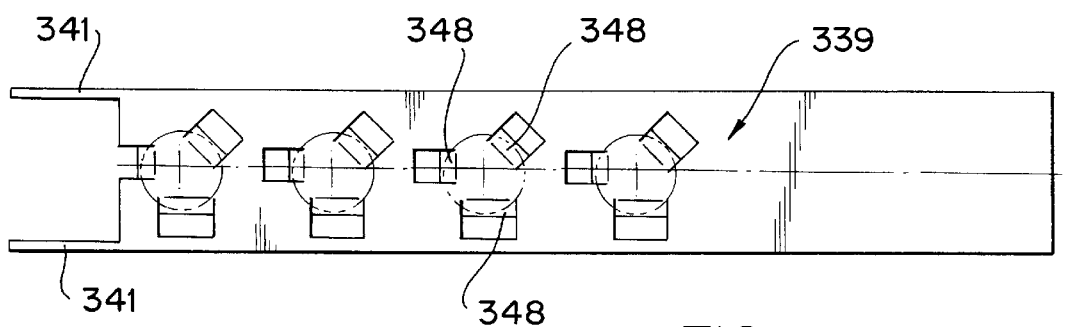
FIG. 33 is a top plan view of the holding device of FIG. 31.

Slide 331 is movable in its longitudinal direction as well as in the penetration and lifting out direction of locking bolt 305. Each locking bolt is arranged in a spring housing 339 of sheet metal, which, as shown in FIG. 31, has a U-shaped transverse profile open in the direction of holder 304. The interior surfaces of the two side pieces 340 extending parallel to one another, as shown in FIGS. 14 and 15, form the guide surface for the outwardly angled longitudinal border of side rails 332 and 333. At both ends of spring housing 339 shaped projections 341 and 342 are provided on the two side pieces 340. The projections can be caught in side groove 343 of flat side piece 322 or groove 344 of rigid side piece 323.

For the engagement of guide tabs 338 projecting from slide 331, side pieces 340 of spring housing 339 are each provided with a window 345. Each window 345 forms a mounting surface for the engaging projecting guide 338, comprises a segment 346 extending parallel to the longitudinal alignment of slide 331 and an inclined segment 347 attached thereto. Included segment 347 extends parallel to the guide surface formed from side piece 322 for the other end of slide 331.

Three tongues 348 pointing downward toward slide 331 are bent out from the yoke part of spring housing 339, each for a helical spring 308. The tongues, as shown in FIG. 16, hold the top ends of the helical springs 308 of identical construction, and hold them nonrotatably. At least the last windings of the two spring ends form two straight segments 308', running at a right angle to one another, as shown in FIG. 17. The cross section of the central passage 330 of locking bolt 305, into which engages the other end of the associated helical spring 308, is of such dimensions that the spring end is also held in it nonrotatably.

Between the two side rails 332 and 333 of slide 331, as shown in FIG. 15, a lifting body 350 of plastic is engaged. The insides of side rails 332 and 333 guide lifting body 350 relative to the slide 331 both in the longitudinal direction and in the vertical direction. The rod-like lifting body 350, as shown in FIG. 28, has strips 351 extending along its two top longitudinal edges and overhanging the sides. Strips 351 are guided by the interior surfaces of side rails 332 and 333. The lifting body 350 is provided with a mounting installation 352 for each of the locking bolts 305. Each mounting installation may receive middle section 327 and flange 328, and may hold them rotatably and axially slidably. As is clearly shown in FIGS. 28 to 30, mountings 352 are open at the sides beneath strips 351. Also, between mountings 352, they are not completely separated from one another. On the end facing down toward holder 304, each mounting 352 is provided with two mounting strips 353 projecting outwardly toward its center. Mounting strips 353 engage and support flange 328 to lift locking bolt 305 from flat rail 301.

For the assembly, first locking bolts 305 are inserted in mounting 352 of lifting body 350. Then lifting body 350 is placed in slide 331. Helical springs 308, which serve as compression springs and as rotary or torsion springs, are then inserted in the central passage 330 of the associated locking bolt 305. Then, slide 331 can be snapped into spring housing 339. Then, the projecting guide tabs 338 engage windows 345. Then, spring housing 339 is snapped onto holder 304 with the aid of the projections 341 and 342. Helical springs 308 are prebiased, preferably such that first the bolts are pressed against the yoke part of spring housing 339 until flange 328 has moved away from lifting body 350. Now, locking bolt 305 can be rotated 180 degrees and can be lowered once more. The rotary prebiasing of helical springs 308 is still maintained, because flattened areas 329 of flange 328 are in contact on side rails 332 and 333. Finally, holder 304 is screwed onto the top rail.

When top rail 321 is locked with bottom rail 320, two of the locking bolts 305 with their cams 312 are each in engagement with one of the detent openings 302 or 302'. The prebiased helical springs 308 hold the one cam 312 of locking bolt 305 found in the locking setting in contact without play on one of the crosspieces 303. Since that end segment 306 of locking bolt 305 snaps in dependent upon its alignment with detent opening 302 or detent opening 302', the play, which is to be eliminated by means of cam 312, is of only the smallest possible value. However, it is expedient to make detent opening 302 greater in the longitudinal alignment of flat rail 301 than the dimensions of detent opening 302', by double the degree of play, which cam 312 can compensate. The rotation of the locking bolt for elimination of play, however, needs to be 90 degrees at the most.

Since the friction between cams 312 and the contact surfaces formed by crosspieces 303 does not suffice to prevent loads or stresses occurring during operation of the vehicle from causing reverse rotation of locking bolts 305, the locking bolts 305 are arranged in holder 304 with sufficient play that the force working on cams 312 causes a slight tilting of each locking bolt in the guiding passage. Thus, the middle section 327 is tightly clamped at both ends of guiding passage 324 between flattened areas 326. This clamping force suffices to prevent locking bolt 305 from being rotated by the forces working on it in locked state.

In order to free top rail 321 for movement in the longitudinal direction along bottom rail 320, slide 331 is moved by means of a traction which engages on transverse part 335 and leads to an operating member which transfers the force against flat side piece 322 of holder 304. Thus, the narrow sides of its windows 336 rotate all flanges 328 when it lifts cams 312 from crosspieces 303, which cams are found in the locking setting. Normally, this means two of the four locking bolts 305. Since the rotation settings of the two locking bolts 305 found in the locking setting are naturally different, then with the thrust or slide of slide 331, the rotation of locking bolts 305 does not occur simultaneously. Rather, first the furthest rotated locking bolt 305 and then thereafter the less rotated locking bolt 305 is rotated in reverse. At the end of the translation movement of slide 331 parallel to flat rail 301, the flattened areas 329 of flange 328 are in contact on the interior of side rail 332, on which also engage flattened areas 329 of those locking bolts 305 which were not found in the locking setting.

This translation movement of slide 331 is connected to a combined translation- and lifting-movement, because transverse part 335 of side piece 322 and projecting guide tabs 338, which have been guided during the translation movement by the horizontal segment 346 of window 345, now are guided by inclined segment 347. With this translation- and lifting-movement, slide 331 is lifted upward relative to locking bolt 305. Thus, flattened areas 329 of flange 328 contact surface areas beneath windows 336. Following this lifting movement of slide 331 relative to locking bolts 305, slide 331, with its top, outward bent edges, comes into contact on the bottom of strip 351 of lifting body 350. With further combined translation- and lifting-movement of slide 331, lifting body 350 carries out a purely lifting movement. As soon as flanges 328 are in contact on mounting strips 353, locking bolts 305 are lifted sufficiently that end segment 306 of every locking bolt 305 disappears in the associated guiding passage 324 of holder 304. By having an intermediate chamber between the bottom of holder 304 and the top of flat rail 301, top rail 321 can now be thrust and can slide noiselessly relative to bottom rail 320.

In the new position, top rail 321 needs only the operation member for the traction engaging on slide 331 to be released. A return spring (not shown) engaging on the slide now causes first the combined translation- and lifting-movement in the opposite direction and then the translation movement. Thus, locking bolts 305 for snapping into the detent openings are freed. Those two locking bolts 305 which are aligned with two of the detent openings 302 or 302' are snapped in under the effect of the pressure which is generated by helical screws 308, each into one of the detent openings. Also, the rotation prebiasing of helical springs 308 causes the snapped-in locking bolts 305 to be rotated until cams 312 engage on crosspieces 303 without any play, and secure top rail 321 against being thrust into bottom rail 320.

While various embodiments have been chosen to illustrate the invention, it will be understood by those skilled in the art that various changes and modifications can be made therein without departing from the scope of the invention as defined in the appended claims.

What is claimed is:

1. A locking device for vehicle seats, comprising:
   a first part having a plurality of first detent openings arranged in a row, each of said openings having a boundary surface; and
   a second part continuously adjustably coupled to said first part and having a plurality of spring-biased locking bolts arranged one behind another and aligned with said detent openings, said locking bolts being independently movable in a first direction relative to said second part between unlocking and locking settings, in said locking settings said locking bolts penetrating said detent openings to a predetermined depth independently of one another and thereby locking releaseably said parts against adjustment without any play in adjusting directions, each of said locking bolts having at least a first portion thereof movable in a second direction independently of movement of said locking bolts in said first direction such that a surface area thereof contacts one of said boundary surfaces without play and without varying said predetermined depth of locking bolt penetration into one of said detent openings.

2. A locking device according to claim 1 wherein
   at least one second detent opening is aligned with each of said first detent openings on a side of said first part remote from said locking bolts, each said second detent opening having a smaller dimension than the respective first detent opening at least in an adjustment direction of said first and second parts without any play.

3. A locking device according to claim 1 wherein
   at least one second detent opening is aligned with each of said first detent openings on a side of said first part remote from said locking bolts, each said second detent opening having smaller dimensions than the respective first detent opening in each adjustment direction of said first and second parts.

4. A locking device according to claim 1 wherein
   an obstruction is associated with each of said locking bolts and secures the respective locking bolt in one of said detent openings.

5. A locking device according to claim 4 wherein
   each said obstruction comprises a blocking element movable transversely to said first direction of locking bolt movement and releasably engagable with an end of said locking bolt in said locking setting thereof remote from an end segment thereof penetrating one of said detent openings.

6. A locking device according to claim 1 wherein
   each said locking bolt comprises a rod-like part which engages in one of said detent openings in said locking setting thereof and at least one wedge body which is longitudinally slidable on said rod-like part in any gap present between said rod-like part and an adjacent section of one of said boundary surfaces until contact is achieved therebetween.

7. A locking device according to claim 6 wherein
   each said wedge body comprises an outer wedge member surrounding and longitudinally slidable on an inner wedge member.

8. A locking device according to claim 6 wherein
   each said wedge body and each said rod-like part are spring-biased in an identical direction.

9. A locking device according to claim 1 wherein
   said first portion of each said locking bolt is rotatable about a longitudinal axis of the respective locking bolt, and is coupled to a rotary device;
   each of said locking bolts comprises an end segment engaged in one of said detent openings in the locking setting thereof, each said end segment having a periphery including a first section with diameters transverse to said longitudinal axis progressively varying along at least a portion of said periphery between a point of smallest diameter and a point of greatest diameter.

10. A locking device according to claim 9 wherein
    each said end segment is non-rotatably coupled to said first portion.

11. A locking device according to claim 9 wherein
    each said locking bolt comprises a rod-like part with said first portion and said end segment thereof being rotatably mounted on said rod-like part.

12. A locking device according to claim 9 wherein
    all points along said first section of each said end segment form angles with said boundary surface at contact points therewith providing self-locking connections.

13. A locking device according to claim 9 wherein
    said first section of each said end segment forms a logarithmic spiral.

14. A locking device according to claim 9 wherein
    each said end segment includes a second section, diametrically opposite said first section, with diameters transverse to said longitudinal axis progressively varying between a point of smallest diameter and a point of greatest diameter, said first and second sections varying in an identical rotational direction.

15. A locking device according to claim 14 wherein
    said first and second sections of each said end segment are radially symmetrical to said longitudinal axis.

16. A locking device according to claim 1 wherein
    a rotary and lifting device is coupled to each of said locking bolts.

17. A locking device according to claim 16 wherein each said rotary and lifting device is combined with a holder receiving all of said locking bolts, said holder including a guiding passage for each of said locking bolts and a holding device for biasing springs biasing said locking bolts in one structural unit.

18. A locking device according to claim 17 wherein each of said biasing springs is a torsional spring having a last winding at each end thereof including at least two angularly oriented straight segments forming non-rotatable connections with one of said locking bolts and said holding device.

19. A locking device according to claim 17 wherein each of said locking bolts comprises a cylindrical segment rotatably and axially slidable in one of said guiding passages of said holder;

said guiding passages are arranged in a row; and each of said guiding passages has a cross-sectional profile with a flattened area in each quadrant, pairs of said flattened areas define wedges tapering in opposite directions of said row of said guiding passages.

20. A locking device according to claim 19 wherein each of said locking bolts comprises an end segment engaged in one of said detent openings in the locking setting thereof; and each of said locking bolts comprises a radially outwardly extending flange at an end of said cylindrical segment remote from said end segment thereof, each said flange having at least one flattened area extending parallel to a row formed by said locking bolts when the respective locking bolt is in a rotational setting for penetrating and being raised completely out of one of said detent openings.

21. A locking device according to claim 20 wherein said rotary and lifting device comprises a slide extending in a row direction of said rows formed by said locking bolts and said detent openings;

said slide is movable in said row direction by an operating means applying a force on said slide counter to a biasing force of a return spring; and said slide comprises a side wall with a window receiving a portion of said flattened area of one of said flanges in said locking setting.

22. A locking device according to claim 21 wherein at least one of said holder and said holding device comprises guide surfaces for said slide; and said guide surfaces cause said locking bolts to undergo a combined translation and lifting movement upon unlocking and translation movement of said slide, during which said locking bolts are rotated to positions for lifting.

23. A locking device according to claim 22 wherein a lifting body is received in said slide and is movable therein in directions of movement of said locking bolts into and out of said detent openings from a side of said slide remote from said holder, said lifting body having a mounting installation for each of said locking bolts and aligned with one of said guide passages, each said mounting installation having a material part and an end thereof directed downwardly into one of said guide passages forming a mounting surface for one of said flanges.

24. A locking device according to claim 23 wherein said lifting body comprises two side walls and material strips at top edges thereof extending outwardly from said two side walls, said slide engaging bottoms of said material strips at a beginning of a lifting movement thereof.

25. A locking device according to claim 24 wherein said holding device comprises clamping elements for joining said holding device with said holder and for connecting said slide and said lifting body.

\* \* \* \* \*